May 31, 1966 V. J. LUNDELL 3,253,557
WAFERING MECHANISM FOR FORAGE CROP WAFERING MACHINES
Filed Sept. 15, 1964 2 Sheets-Sheet 1

INVENTOR.
VERNON J. LUNDELL
BY
Wolfe, Hubbard, Voit & Osann
ATTORNEYS.

INVENTOR.
VERNON J. LUNDELL
BY
ATTORNEYS.

United States Patent Office 3,253,557
Patented May 31, 1966

3,253,557
WAFERING MECHANISM FOR FORAGE CROP
WAFERING MACHINES
Vernon J. Lundell, Cherokee, Iowa, assignor to Massey-Ferguson Services N.V., Netherlands Antilles, a corporation of the Netherlands Antilles
Filed Sept. 15, 1964, Ser. No. 396,679
6 Claims. (Cl. 107—14)

The present invention relates generally to agricultural machines of the type intended primarily for treating forage crops and concerns more particularly an improvement in such machines for forming forage crop material into wafers.

Recently there have been developed machines of practical utility for converting forage crop material into relatively small, dense, and uniform blocks called wafers or pellets. These machines include means for chopping and co-mingling stems and leaves of the crop material and a wafering mechanism into which the co-mingled mass is delivered and by which it is compacted into wafer form. The wafering mechanism includes a series of die cells and means for compressing the crop materials into and through the die cells so as to thereby form it into wafers.

Since the forage crop material to be compacted into wafers frequently varies considerably in moisture content and in the nature and ratio of stems and leaves, the density of the resulting wafers often varies considerably.

Accordingly, the primary aim of the present invention is to provide an improved wafering mechanism for a forage wafering machine which includes means for automatically and simultaneously controlling the density and improving the bonding characteristics of forage crop wafers produced by the machine.

It is a more particular object to provide means movable into each of the die cells of the wafering mechanism for controlling the density of the forage crop material being extruded through each of the die cells and to simultaneously compress selected portions of the forage crop material into grooves formed in the sides of the individual wafers.

It is a related object to provide a mechanism of the above type wherein the depth of the grooves in the individual wafers is a function of the overall density and compaction characteristics of the forage crop material being formed into wafers.

Other objects and advantages of the invention will become apparent upon reading the following detailed description and upon reference to the drawings in which.

Figure 1:
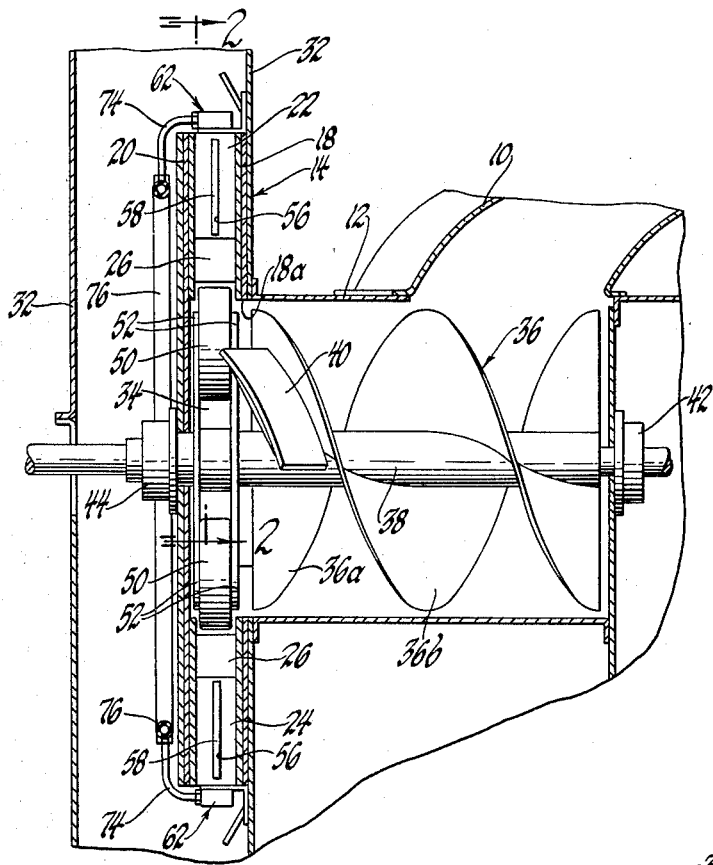
FIGURE 1 is a fragmentary transverse vertical section of a wafering mechanism and means for transferring crop material into the same.

While the invention will be described in connection with certain preferred embodiments, it will be understood that I do not intend to limit the invention to those embodiments. On the contrary, I intend to cover all alternatives, modifications and equivalents as may be included within the spirit and scope of the invention as defined by the appended claims.

Wafering machines of the type here concerned conventionally include means for receiving, chopping and co-mingling forage crop material and delivering it to the wafering mechanism. Such a receiving and chopping means has not been illustrated in the accompanying drawings. Suffice it to say, however, this means delivers the chopped and co-mingled leaves and stems by way of a chute 10 into a hopper 12 from which it is delivered into a wafering mechanism, generally indicated at 14. The wafering mechanism 14 includes means defining a series of die cells 16 and the forage crop material is delivered into juxtaposition with respect to the entrance of the die cells and is continuously forced into the die cells so that the forage crop material is formed into pressed masses within the cells. As more and more of the crop material is forced into the die cells, the material compressed within the cells is caused to extend beyond the exit ends of the die cells where it is separated into substantially predetermined lengths comprising the formed wafers.

In the illustrative device, the means defining the die cells 16 of the wafering mechanism 14 includes side plates 18 and 20 and transverse partitions 22 and 24. As shown, the side plates 18, 20 are disposed in spaced parallel relation to each other and the partitions 22 and 24 are interposed between the spaced side plates which are maintained in such relation by any suitable means, such as by bolts (not shown). Thus, the inner faces of the side plates 18, 20 define the transverse walls of the die cells 16 and the inner faces of the partitions 22, 24 define the longitudinal walls of the die cells.

At the entrance ends of the die cells 16, the longitudinal cell walls are defined by tips 26. The tips are preferably formed of hardened steel with their inner ends defining knife-like edges 28 and with outwardly diverging longitudinal faces which terminate at their outer ends adjacent the partitions 22, 24. Outwardly of the tips 26, the partitions 22 and 24 are arranged in oppositely facing pairs, disposed in back-to-back relation to one another between adjacent die cells 16. The back-to-back partitions 22 and 24 are also disposed to converge inwardly from adjacent the exit ends of the die cells toward the entrance ends.

In the illustrative wafering mechanism 14, the die cells are radially disposed in an annular arrangement with their inner or entrance ends defining the inner periphery of the annulus and their exit ends defining the outer periphery thereof. The wafering mechanism 14 is disposed within a housing 32 which not only encloses the mechanism but also serves to receive the wafers of forage crop material formed by the wafering mechanism. The space within the inner periphery of the annulus of die cells comprises an extruder-feed chamber 34.

The loose mass of chopped forage crop material is transferred from the hopper 12 into the extruder-feed chamber 34. An access opening 18a is formed in the right sidewall of the housing 32 and the side plate 18 thereby providing communication between the hopper 12 and the extruder-feed chamber 34.

For conveying the crop material from the hopper 12 through the opening 18a, the illustrative machine includes an auger type conveyor 36. As shown, the conveyor 36 is composed of two helical flights 36a and 36b which are rigid with a shaft 38. The terminal faces of the auger flight are equipped with vanes 40 which are of arcuate form and extend into the extruder-feed chamber 34 to insure delivery of the crop material into proximate juxtaposition adjacent the entrance ends of the die cells 16. The right end of the shaft 38 is journalled in a bearing 42 which is mounted on the right end wall of the hopper 12 as shown in FIG. 1. The shaft 38 extends through the hopper 12 and coaxially through the extruder-feed chamber 34 and is journalled at its left end in the bearing 44 mounted on the outer end wall 20 of the wafering mechanism 14 which closes that side of the extruder-feed chamber.

Preferably, the conveyor 36 is rotated at a relatively high speed so as not only to transfer the chopped crop material received in the chopper 12 into the extruder-feed chamber 34, but in so doing to impart thereto a whirling motion so that the crop material is distributed, centrifugally, about the periphery of the extruder-feed chamber over the entrance ends of the die cells 16.

Figure 2:
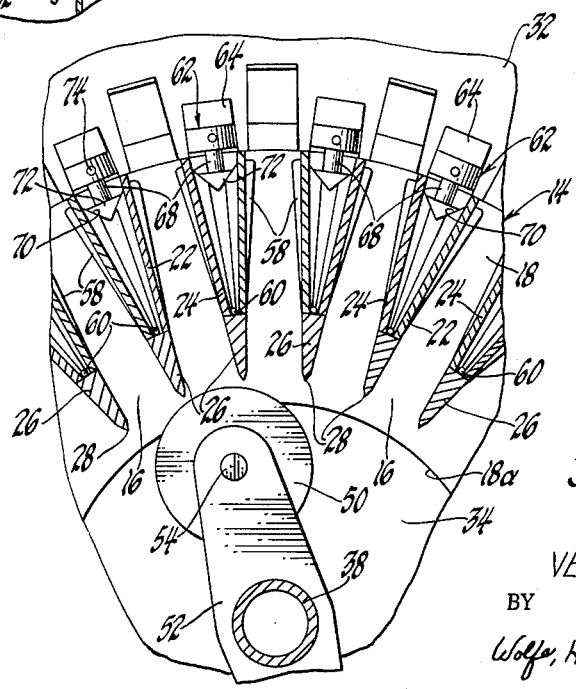
FIG. 2 is an enlarged partial sectional view taken substantially in the plane indicated by line 2—2 in FIG. 1.

The crop material that is disposed about the extruder-feed chamber 34 is then pressed into the die cells 16 and against the knife edges 28 to sever the crop material that is forced into adjacent die cells. For this purpose, the exemplary wafering mechanism 14 utilizes a pair of rollers 50 of substantial mass. The rollers are carried by a frame which includes a pair of diametrically extending arms 52 disposed within the extruder-feed chamber 34. Each of the rollers 50, as shown in FIG. 2, is of annular form and is journalled upon a stub shaft 54 mounted between the outer ends of the arms 52. Thus, the rollers are so located that the peripheral surfaces of the rollers traverse a path close to but spaced slightly from the periphery of the extruder-feed chamber 34 as defined by the entrance ends of the die cells 16 determined by the knife edges 28.

In accordance with the present invention, provision is made for varying the degree of compaction with which the forage material is compressed into wafers within the die cells 16. To this end, each of the transverse partitions 22, 24 is formed to define an opening 56 in which a density control member 58 is disposed. For controlling the density of the compressed wafers, each of the members 58 is movable through its respective opening 56 into one of the die cells 16. Thus, by projecting into the die cells, the members 58 increase the resistance that the forage crop material encounters in passing through the die cells and accordingly the forage material is compressed to a greater degree in order to overcome this increased resistance.

As shown in FIGS. 1–5, the openings 56 in the illustrative embodiment are generally slot-like and are disposed substantially parallel to the path of travel of the forage crop material which passes through the die cells. Preferably, each of the density control members 58 is formed with a tapered configuration, wider at its outer end than at its inner end. This construction not only permits two of the members 58 to be neatly nested in their retracted positions in the space provided between a pair of the back-to-back walls 22, 24, but also, it permits the members to extend well into their respective die cells adjacent the exit end thereof (see FIG. 3).

Figure 3:
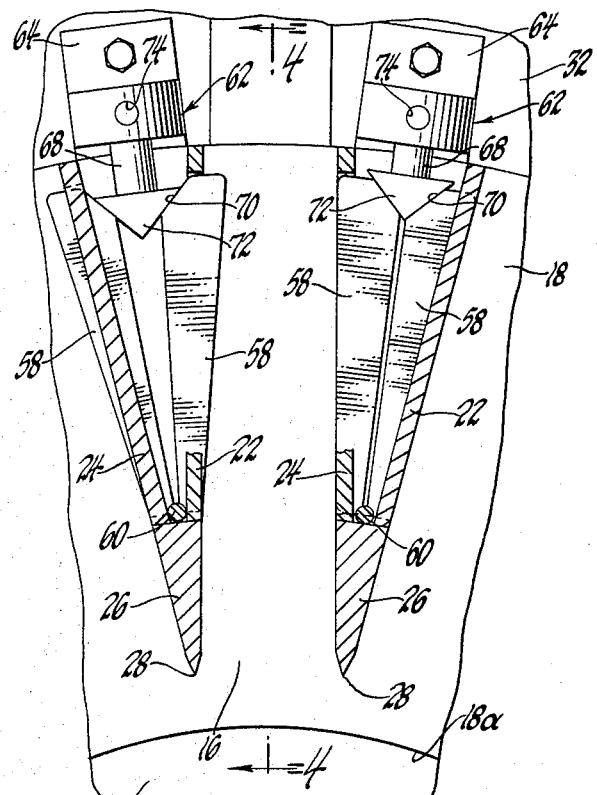
FIG. 3 is a still further enlarged fragmentary sectional view of a portion of the apparatus shown in FIG. 2 with certain portions broken away to better illustrate the density control apparatus.
Figure 4:
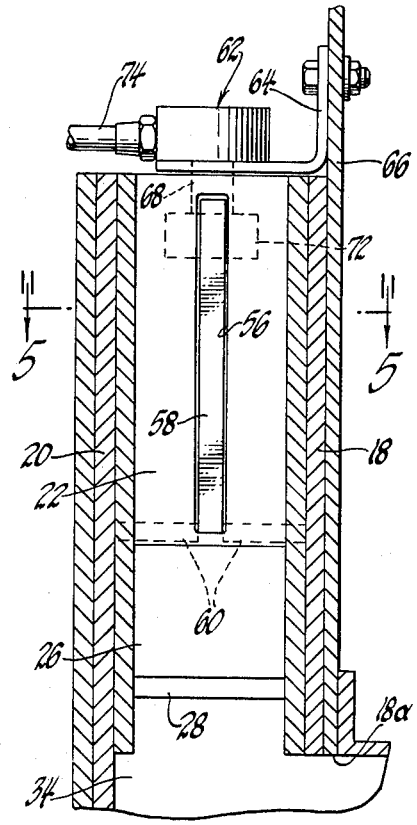
FIG. 4 is a fragmentary sectional view also on an enlarged scale taken substantially in the plane indicated by the line 4—4 in FIG. 3.
Figure 5:
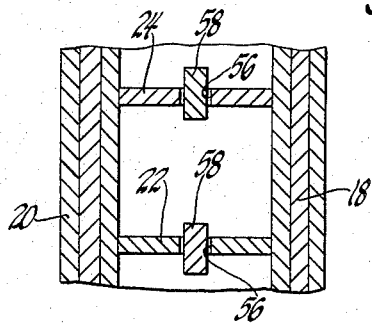
FIG. 5 is another fragmentary sectional view on an enlarged scale taken substantially in the plane indicated by the line 5—5 in FIG. 4.

To insure that the density control members do not project abruptly into the die cells 16, the lower ends of each member is secured to a pivotal mounting rod 60. As shown in FIGS. 3 and 4, the pivot rods 60 are disposed between the back-to-back walls 22, 24 and adjacent the outer end of the tips 26. As a result of this arrangement, it will be appreciated that each pair of the opposed density control members 58 can be moved through their respective openings 56 so as to project into the die cells 16 in progressively greater amounts from adjacent the entrance ends to adjacent the exit ends of the die cells. Thus, the smooth flow of material through the die cells is insured even when the density control members 58 are moved outwardly to achieve maximum compaction of the wafers. In addition, it will be appreciated that the pivot rods 60 are actually protected from the crop material and thus are not subject to fouling or the undesirable accumulation of crop material thereon.

For moving the density control members 58 through the openings 56, hydraulic actuators 62 are provided. As shown in FIGS. 2–4, the actuators 62 are disposed outwardly of the die cells 16 and are mounted between the back-to-back walls 22, 24 on brackets 64 bolted to an extending portion 66 of the wall 18. It will be understood that each actuator includes a piston (not shown) operable within a cylinder and an operating rod 68 is coupled directly to the piston so as to project from the cylinder.

In the embodiment illustrated in FIGS. 1–5, each of the density control members 58 is formed with a sloping cam surface 70 adjacent its outer end and a wedge-shaped cam element 72 is carried by each of the actuator operating rods 68. Thus, each of the actuators 62 is operable to cam a pair of the members 58 out through the openings 56 in the back-to-back walls 22, 24. It will also be appreciated that this camming arrangement of the oppositely directed control members 58 greatly reduces the load imposed on each of the actuators.

To simultaneously control all of the actuators 62, and thus the density of the forage material being compressed in the die cells 16, the actuators are all connected to a common source of hydraulic pressure fluid. As best seen in FIG. 1, each of the actuators 62 is provided with a supply line 74. The supply lines 74, in turn, are all coupled to a ring-type manifold 76 which is supplied with hydraulic fluid at a controlled pressure by a suitable pump and valve mechanism (not shown). Therefore, since the hydraulic pressure in each of the actuators 62 is the same, the force exerted on the density control members is also identical and, accordingly, forage crop wafers of uniform density are extruded through all of the die cells 16. The density of the wafers, of course, can be changed simply by altering the hydraulic pressure in the manifold 76.

It is another feature of the invention that the density control members 58 facilitate the bonding characteristics of the wafers being extruded through the die cells 16. Thus, each of the density control members 58 not only operates to increase the resistance of the forage crop material through the die cells, but also forms a groove-like depression in each of the wafers. The crimping action and the increased compression of the forage crop material in the area of these grooves has been found to improve the bonding characteristics of the individual wafers.

Figure 6:
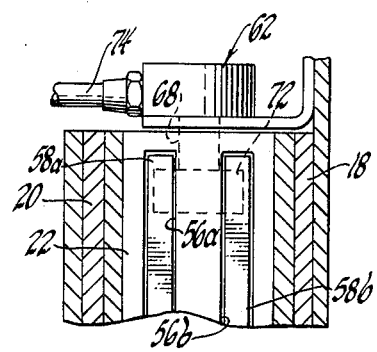
FIG. 6 is a fragmentary sectional view on an enlarged scale similar to FIG. 4 showing a modification of the present invention.

Turning now to FIG. 6, a modification of the present invention is illustrated by way of a fragmentary cross sectional view. As shown here two density control members 58a and 58b operate through two openings 56a and 56b in each of the partitions 22, 24 (only one of which is shown). In this way increased resistance to the flow of forage crop material through the die cells can be provided. It will also be understood that this embodiment of the density control mechanism causes the wafers to be formed with two highly compressed grooves in their opposite sides. In other respects the mechanism shown in FIG. 6 is similar to that illustrated in FIGS. 1–5 and similar reference numbers for similar parts have, therefore, been provided.

Figure 7:
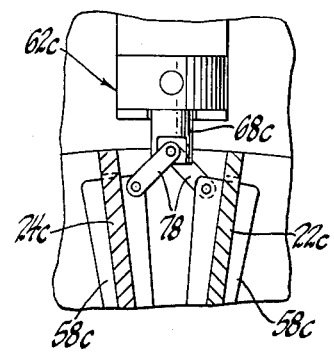
FIG. 7 is a fragmentary sectional view similar to FIG. 3 of a further modification of the present invention.

A further modification of the invention is illustrated in FIG. 7. As shown here, each of the density control members 58c is linked by a toggle lever 78 to the operating plunger 68c of the actuators 62c. Thus, as the plunger 68c is extended from the actuator 62C, both of the oppositely directed members 58c are urged progressively further through the openings in their respective die cell walls 22c and 24c. The other details of this modified arrangement are similar to the previously discussed embodiments and similar reference numbers have been provided.

From the foregoing, it will be appreciated that the density control members 58 provided by the present invention afford a simple, yet effective, mechanism for regulating the degree of compaction with which the forage crop material is compressed into wafers within the individual die cells 16. In addition, the control members 58, by pressing grooves into the wafers, also increase the bonding characteristics of the formed wafers. It will also be seen that by using simple and easily formed parts the density control mechanism can be economically and efficiently manufactured. Moreover, when the density control members 58 become worn through continued use, they can be conveniently replaced without necessitating the replacement of the entire die cell structures.

I claim as my invention:

1. For use in a forage wafering mechanism including means defining a plurality of spaced-apart die cells having entrance and exit ends and means for compressing forage crop material into the entrance ends and out through the exit ends of said die cells to compact said material into wafers, the combination comprising, at least one wall of each of said die cells including means formed to define a generally slot-like opening therein disposed generally parallel to the path of movement of forage crop material through said die cell, a generally wedge-shaped member disposed in and movable through each of said openings with the narrow end thereof adjacent the entrance end of said die cell, said members each having a surface portion positionable between a first location substantially flush with the inner surface of said corresponding one wall and a second location extending into said die cell from said one wall a greater distance adjacent said exit end than adjacent said entrance end, said members each formed to define a sloping cam surface adjacent the exit end of said die cell, and means including a plurality of hydraulic actuators each having a plunger, with a tapered cam element thereon engageable with said cam surface for selectively moving said members out through said openings as a control of the degree of compaction with which said forage crop material is compressed into wafers within said die cells.

2. For use in a forage wafering mechanism including means defining a plurality of spaced-apart die cells having entrance and exit ends and means for compressing forage crop material into the entrance ends and out through the exit ends of said die cells to compact said material into wafers, the combination comprising, at least one wall of each of said die cells including means formed to define a generally slot-like opening therein disposed generally parallel to the path of movement of forage crop material through said die cell, a generally wedge-shaped member disposed in and movable through each of said openings with the narrow end thereof adjacent the entrance end of said die cell, said members each having a surface portion positionable between a first location substantially flush with the inner surface of said corresponding one wall and a second location extending into said die cell from said one wall a greater distance adjacent said exit end than adjacent said entrance end, means including a plurality of hydraulic actuators each having a plunger disposed parallel to said one wall, and a link interconnecting each of said plungers with one of said members adjacent the exit end of said die cells so that as said plungers are selectively moved toward the entrance ends of said die cells said members are moved out through said openings as a control of the degree of compaction with which said forage crop material is compressed into wafers within said die cells.

3. For use in a forage wafering mechanism including means defining a plurality of spaced-apart die cells having entrance and exit ends and means for compressing forage crop material into the entrance ends and out through the exit ends of said die cells to compact said material into wafers, the combination comprising, at least one wall of each of said die cells including means formed to define a plurality of openings therein, a movable member disposed in each of said openings, and means including a plurality of hydraulic actuators for selectively moving said members in unison through said plurality of openings in said one wall as a control of the degree of compaction with which said forage crop material is compressed into wafers within said die cells.

4. For use in a forage wafering mechanism including means defining a plurality of spaced-apart die cells having entrance and exit ends and means for compressing forage crop material into the entrance ends and out through the exit ends of said die cells to compact said material into wafers, the combination comprising, a pair of opposed walls for each of said die cells including means formed to define a generally slot-like opening therein disposed generally parallel to the path of movement of forage crop material through said die cell, a generally wedge-shaped member disposed in and movable through each of said openings with the narrow end thereof adjacent the entrance end of said die cell, said members each having a surface portion positionable between a first location substantially flush with the inner surface of said corresponding wall and a second location extending into said die cell from said wall a greater distance adjacent said exit end than adjacent said entrance end, means including a plurality of hydraulic actuators each having a plunger disposed substantially parallel to said walls and means interconnecting said plungers and corresponding ones of said members adjacent the exit end of said die cells so that as said plungers are selectively moved toward the entrance ends of said die cells said members are moved out through said openings as a control of the degree of compaction with which said forage crop material is compressed into wafers within said die cells.

5. The combination defined in claim 4 wherein said die cells are disposed in an annular array about said compressing means and each of said die cells is defined by a pair of substantially parallel, circumferentially spaced walls and a pair of substantially parallel, axially spaced walls, said circumferentially spaced walls between adjacent die cells being arranged in back-to-back relation and each having an opening defined therein with a member disposed in each opening, and said selective moving means being arranged to move said members through said openings in said back-to-back walls into said adjacent die cells.

6. The combination defined in claim 5 wherein said back-to-back walls are disposed in inwardly converging relation to one another terminating in abutting relation against a tapered tip defining a knife edge separating the entrance ends of two adjacent die cells and said members are pivotally mounted at their inner ends between said back-to-back walls adjacent said tip whereby the outer ends of said members are movable out through said openings and into said adjacent die cells.

References Cited by the Examiner

UNITED STATES PATENTS

| | | | |
|---|---|---|---|
| 729,149 | 5/1903 | Fenn | 25—12 |
| 751,752 | 2/1904 | Pilloid. | |
| 2,452,555 | 11/1948 | La Roza | 137—153 |
| 2,902,922 | 9/1959 | Williams | 100—43 |
| 3,134,344 | 5/1964 | Lundell | 107—14 |
| 3,166,026 | 1/1965 | Crane | 107—14 |
| 3,170,414 | 2/1965 | Harrington et al. | 107—14 |

FOREIGN PATENTS 457,753   6/1949   Canada.

WALTER A. SCHEEL, *Primary Examiner.*

BILLY J. WILHITE, *Examiner.*